Dec. 9, 1924.

L. D. FREEMAN ET AL 1,518,319

VENTILATOR FOR MOTOR VEHICLES

Filed June 2, 1923     2 Sheets-Sheet 1

Inventors
L. D. Freeman,
R. Hunt.

By Lacey & Lacey, Attorneys.

Dec. 9, 1924.
L. D. FREEMAN ET AL
1,518,319
VENTILATOR FOR MOTOR VEHICLES
Filed June 2, 1923      2 Sheets-Sheet 2
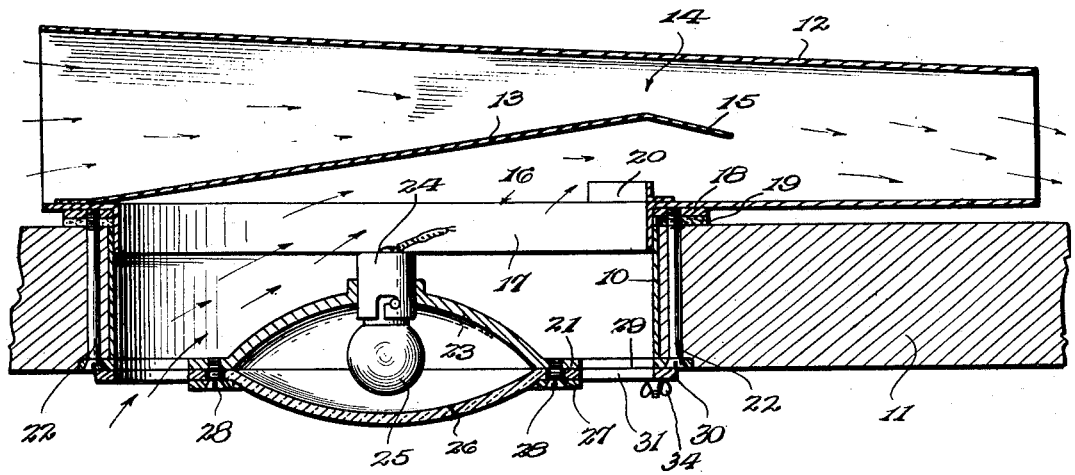
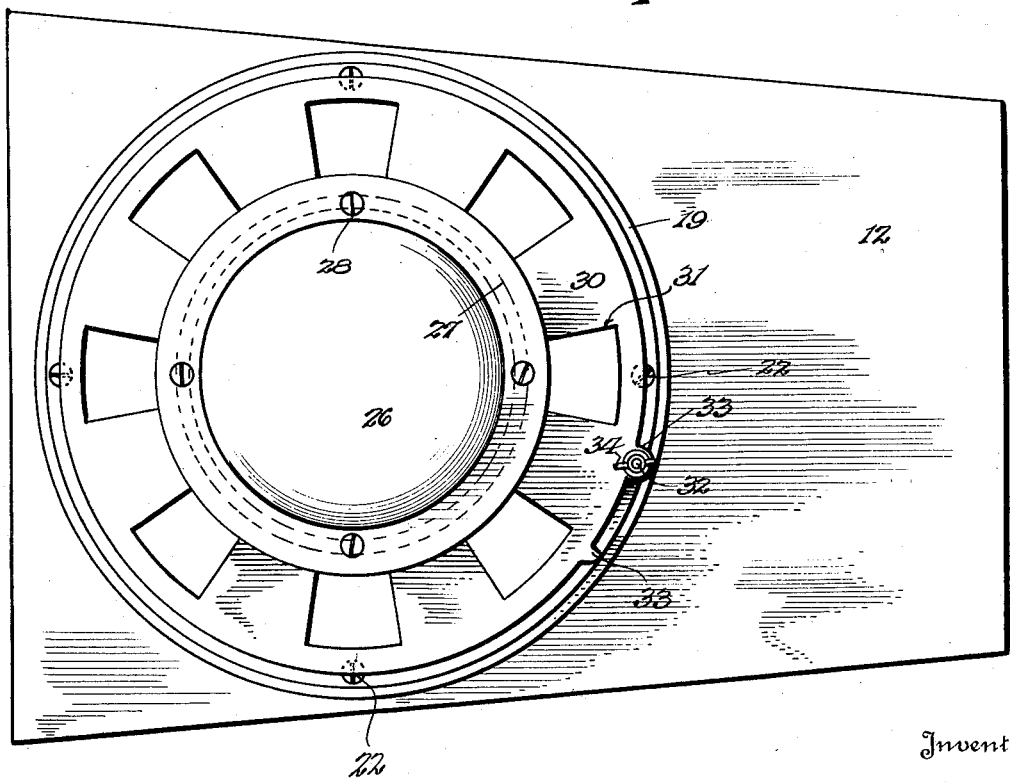
Inventors
L. D. Freeman.
R. Hunt.
By
Lacey & Lacey, Attorneys Patented Dec. 9, 1924.

1,518,319

UNITED STATES PATENT OFFICE.

LEWIS D. FREEMAN AND ROBERT HUNT, OF PORTSMOUTH, VIRGINIA.

VENTILATOR FOR MOTOR VEHICLES.

Application filed June 2, 1923. Serial No. 642,929.

*To all whom it may concern:*

Be it known that we, LEWIS D. FREEMAN and ROBERT HUNT, citizens of the United States, residing at Portsmouth, in the county of Norfolk and State of Virginia, have invented certain new and useful Improvements in Ventilators for Motor Vehicles, of which the following is a specification.

This invention relates to a ventilator for motor vehicles and seeks, among other objects, to provide a device embodying a neat, attractive and efficient ventilator structure which will function, when the vehicle is in motion, for exhausting impure air from within the vehicle body with a consequent induction of fresh air so that the air within the body will be maintained pure and free from obnoxious gases.

The invention seeks, as a further object, to provide a device wherein the outflow of air through the device may be readily regulated.

And the invention seeks, as a still further object, to provide a device which may be readily mounted upon the roof of a vehicle and which, when installed, will not detract from the appearance of the vehicle.

Other and incidental objects will appear hereinafter.

In the drawings:

Figure 3 is a vertical sectional view taken medially through the device, and

Figure 4 is a detail bottom plan view of the device.

Figure 1:
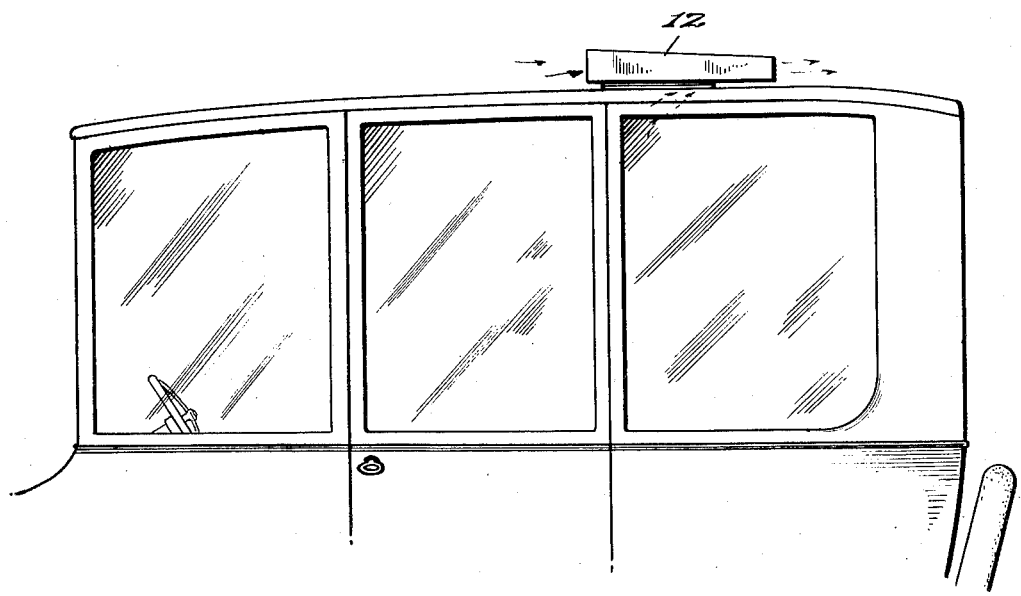
Figure 1 is a fragmentary side elevation showing our improved device applied.
Figure 2:
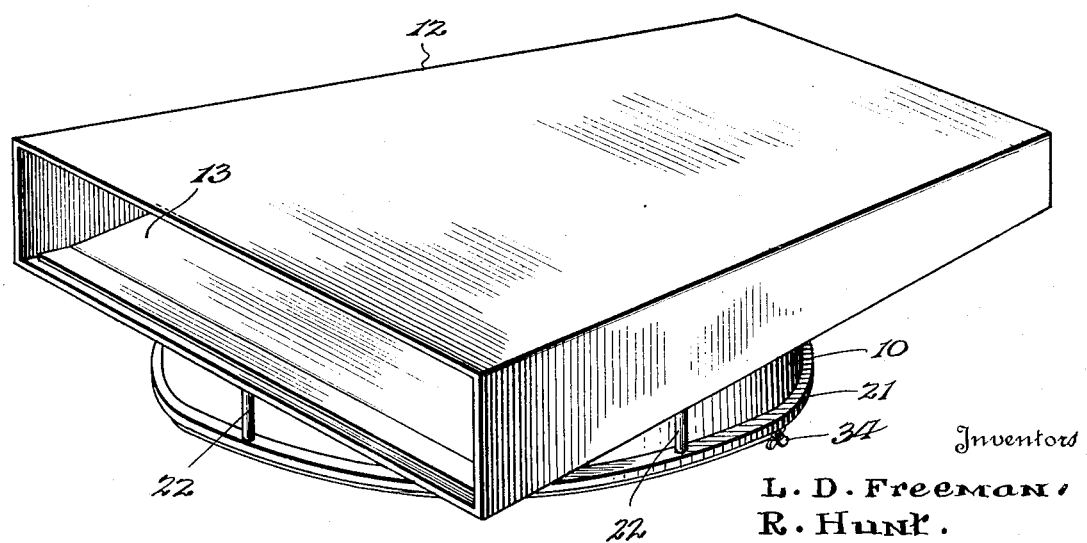
Figure 2 is a detail perspective view of the device.

In carrying the invention into effect, we employ an outlet or pipe 10 which is of a length to extend through the roof of a vehicle body. In the drawings, we have conventionally shown a vehicle body having a roof 11. Cooperating with the outer end of the pipe is a longitudinally tapered aspirating hood 12 which is preferably oblong in general contour and what might well be termed flat in nature so as not to provide an undesirable obstruction above the roof of the vehicle. As will be observed, the hood is formed with a flat bottom wall, a flat top wall which is gradually inclined downwardly toward the rear end of the hood, and with flat parallel side walls which gradually converge toward the rear end of the hood.

Thus, the hood is more or less wedge-shaped in general configuration and secured at one end to the bottom wall of the hood near the mouth thereof is a partition 13 extending from side to side of the hood and gradually inclining upwardly toward the rear end of the hood to define a reduced throat 14 within the hood, the rear margin of the partition being tilted downwardly to provide a sheltering lip 15 at the rear end of the partition. Formed in the bottom wall of the hood is an opening 16 and surrounding said opening is a depending annular flange 17 which may be struck from the bottom wall of the hood and snugly fits within the upper end of the pipe 10 connecting the hood therewith. Surrounding said flange is a reinforcing ring 18 appropriately secured to the bottom wall of the hood and interposed between said ring and the roof 11 of the vehicle body is an appropriate annular gasket 19. As will be observed, the opening 16 terminates at its rear side in a plane with the throat 14 so that the lip 15 thus overhangs said opening at the rear thereof to prevent a downward rush of air currents into said opening, and suitably fixed to the bottom wall of the hood to extend along the rear side of the opening from side to side of the hood is an upstanding flange 20 to prevent any water finding entrance at the rear end of the hood from running along the bottom wall thereof into said opening.

Countersunk in the roof 11 of the vehicle body at its inner side to overlie the pipe 10 is a circular end plate 21 upon which the pipe rests and extending through the peripheral margin of said plate and through the roof are circumferentially spaced screw bolts 22 threaded into the reinforcing ring 18 of the hood. Thus, these bolts will serve to hold the hood, pipe and end plate in assembled relation upon the roof and may be adjusted to compress the gasket 19 so that the gasket will thus provide a sealed joint between the hood and the roof. Centrally, the plate 21 is bowed upwardly to define a reflector bowl 23 mounting an axially disposed lamp socket 24 of appropriate design and removably fitting in said socket is a lamp 25. Closing the bowl is a downwardly dished transparency 26, the margin of which seats flat against the plate 21 at the rim of the bowl and removably securing said transparency in position is a clamping ring 27 overlying the margin of the transparency. As brought out in Figure 4, the ring 27 is connected with the plate 21 by a plurality of circumferentially spaced screws 28. Formed in the plate 21 to surround the bowl 23 is a series of circumferentially spaced openings 29 terminating at their outer ends flush with the inner face of the pipe 10 and fitting between the clamping ring 27 and the plate 21 is a damper ring 30 surrounding the transparency 26. This damper ring is of slightly less thickness than the peripheral margin of the transparency so that the ring is thus rotatably supported by the clamping ring, being centered with respect to the plate 21 by the screws 28, and formed in said damper ring is a plurality of circumferentially spaced openings 31 similar to the openings 29 in said plate and adapted to be brought into register therewith. Depending from the plate 21 is, as shown in Figure 4, a stud 32 and projecting from the periphery of the damper plate 30 are spaced lugs 33 engageable with said stud for limiting the damper plate in its movement to open and closed position. Threaded upon the stud is a clamping nut 34 which may be adjusted to engage the plate 30 for binding the plate in the position desired.

As will now be understood in view of the foregoing, when the vehicle is in motion, air will be caused to flow rearwardly through the hood 12. As the air currents reach the throat 14 of the hood said currents will, due to the restriction of the throat, be increased in velocity with the result that immediately upon emerging from the throat, said currents will expand or spread downwardly over the lip 15 and set up a suction through the pipe 10 of the ventilator. Accordingly, air within the vehicle body will be drawn out through said pipe and by adjusting the damper plate 30, the outflow of air may be controlled as desired. Thus, the air within the vehicle body may be maintained fresh and pure without discomfort to the occupants of the vehicle. The lamp 25 may, of course, be electrically connected with the storage battery of the vehicle or other suitable source of electrical energy thereon so that, when desired, a circuit may be closed through said lamp for providing illumination within the vehicle body.

Having thus described the invention, what is claimed as new is:

1. A device of the character described including an outlet, an aspirating hood associated with the outer end thereof, a plate associated with the inner end of the outlet and provided with an opening, a damper plate having a central opening and controlling flow through the opening in the first-mentioned plate, and an annulus secured to the first-mentioned plate centrally of the same and at the inner margin of the damper plate for rotatably supporting the damper plate at its inner margin.

2. A device of the character described including an outlet, an aspirating hood associated with the outer end thereof, a plate associated with the inner end of the outlet and provided with an opening, a damper plate having a central opening and controlling flow through the opening in the first-mentioned plate, an annulus secured to the first-mentioned plate centrally of the same and at the inner margin of the damper plate for rotatably supporting the damper plate at its inner margin, and means for binding the damper plate against rotation.

3. A device of the character described including an outlet, an aspirating hood associated with the outer end thereof, a plate associated with the inner end of the outlet and provided with an opening, a damper plate controlling flow through said opening, and an annulus having its outer margin rotatably supporting the damper plate and having its inner margin disposed to support a transparency.

4. A device of the character described including an outlet, an aspirating hood associated with the outer end thereof, a plate associated with the inner end of the outlet and provided with an opening, an annular damper plate controlling flow through said opening, and an annulus having its outer margin overlying the inner margin of the damper plate rotatably supporting the damper plate and having its inner margin disposed to support a transparency accommodated through the opening of said annulus.

In testimony whereof we affix our signatures.

LEWIS D. FREEMAN. [L. S.]
ROBERT HUNT. [L. S.]